United States Patent [19]
Battersby et al.

[11] Patent Number: 5,740,370
[45] Date of Patent: Apr. 14, 1998

US005740370A

[54] SYSTEM FOR OPENING CACHE FILE ASSOCIATED WITH DESIGNATED FILE OF FILE SERVER ONLY IF THE FILE IS NOT SUBJECT TO BEING MODIFIED BY DIFFERENT PROGRAM

[75] Inventors: Clinton Brenton Battersby, Stoughton; James Gerard Luth, Mansfield, both of Mass.

[73] Assignee: Clinton Battersby, Stoughton, Mass.

[21] Appl. No.: 624,699

[22] Filed: Mar. 27, 1996

[51] Int. Cl.$^6$ .................................................. G06F 12/08
[52] U.S. Cl. ........................ 395/200.49; 395/610
[58] Field of Search ................ 395/200.33, 200.54, 395/200.49, 182.04, 601, 608, 610, 616, 617, 440

[56] References Cited

U.S. PATENT DOCUMENTS

5,261,051  11/1993  Masden et al. .................... 395/479
5,367,698  11/1994  Webber et al. .................... 395/200.33
5,452,447  9/1995   Nelson et al. .................... 395/621
5,559,984  9/1996   Nakano et al. .................... 395/448
5,594,863  1/1997   Stiles .............................. 395/182.13
5,611,049  3/1997   Pitts ............................... 395/608
5,615,373  3/1997   Ho ................................. 395/726
5,628,005  5/1997   Hurvig ............................ 395/608
5,634,122  5/1997   Loucks et al. .................... 395/608
5,644,751  7/1997   Burnett ........................... 395/440

*Primary Examiner*—Moustafa M. Meky
*Attorney, Agent, or Firm*—Banner & Witcoff, Ltd.

[57] ABSTRACT

A network cache system includes a shared cache server and a conventional file server connected to a computer network which serves a plurality of client workstation computers. Each client computer may additionally include a local non-volatile cache storage unit for caching data transferred to the client from a network server or from the shared cache server. Each client computer further includes a resident redirector program which intercepts file manipulation requests from executing application programs and redirects these requests to either the shared network cache or the local non-volatile cache when appropriate.

20 Claims, 10 Drawing Sheets

SYSTEM FOR OPENING CACHE FILE ASSOCIATED WITH DESIGNATED FILE OF FILE SERVER ONLY IF THE FILE IS NOT SUBJECT TO BEING MODIFIED BY DIFFERENT PROGRAM

FIELD OF THE INVENTION

The invention relates to electronic data processing systems and, more particularly, to caching systems for improving the efficiency with which data transfers are performed between computers and network file servers.

COPYRIGHT AUTHORIZATION

Copyright 1995, 1996 Measurement Techniques, Inc. All rights reserved.

A portion of the disclosure of this patent document contains material which is subject to copyright protection. The copyright owner has no objection to the facsimile reproduction by anyone of the patent document for the patent disclosure, as it appears in the Patent and Trademark Office patent files or records, but reserves all copyright rights whatsoever.

BACKGROUND OF THE INVENTION

Cache memory mechanisms are widely used to improve the performance of computers which access information from sources which operate a speeds slower than the speed of the processor. The cache memory provides temporary, higher speed storage which enables the processor to more rapidly access previously fetched information. The larger the cache, the faster the performance, since there is a greater chance that the instructions or data required next will already be in the cache.

Cache memory takes different forms. A internal CPU cache is a high-speed memory bank that sits between the computer's random access memory and the CPU. The internal CPU cache is composed typically of SRAM chips, which provide faster access to the memory bits than the common DRAM chips used for most main memories. A disk cache is a reserved section of normal memory, or an additional memory bank on the disk controller board, which improves the efficiency of data transfers between a disk storage unit and the CPU. When the disk is read, a large block of data is copied into the cache from the disk. If subsequent requests for data can be satisfied in the cache, a slower disk access is not required. Disk caches that use regular memory are typically managed by a disk caching program, such as the SmartDrive caching program provided by Microsoft Corp. as part of the DOS and Windows 3.1 operating systems whereas disk caches built into the disk controller are managed by hardware or software on the board itself. Caching had proven to be particularly valuable when used in conjunction with slower hard disks or CD-ROM memory units.

Caching mechanisms have also been developed to speed access to data stored on file servers accessed over a local area network (LAN). These products, usually provided as part of the network operating system, work like conventional caches, storing most recently used data in a local RAM cache. Like conventional caches, these network caches do not provide non-volatile storage (i.e., they do not retain stored information when powered down), nor do they provide a mechanism for sharing the cached information with other nodes across a LAN.

A related class of programs, often used to support mobile PC computing, replicate portions of the data stored on a file server on the user's local hard disk, typically making copies of entire directory structures and files from the server to allow off-line access to the files. Although useful for some applications, this approach brings with it the risk of unauthorized access to the replicated file system, violating established standards for data security. File replication may also inadvertently automate the unauthorized use of copyrighted software when application software or licensed data files on a file server are copied to a user's hard disk and then used off-line without notifying the network metering software. In addition, any caching system which operates in a networked, shared access environment must provide a high degree of "cache coherency" to ensure that multiple users accessing and modifying data are presented with a unified view of the actual data.

Although many LANs were originally designed to handle printer sharing, databases and E-mail, LANs are now being used for a much wider range of tasks, including the sharing of user data, groupware and application software, image data and electronic fees. As the burdens placed on networks have grown, so to has the need for an improved mechanism for caching the data transfers which occur over the network in non-volatile storage in order to boost performance while maintaining cache coherency and avoiding the violation of existing security and application metering standards.

SUMMARY OF THE INVENTION

The present invention takes the form of methods and apparatus for caching data which is transferred to a client computer via a network pathway from a file server and utilizes a resident file request redirector which executes on the client computer for directing file read requests to a non-volatile cache storage unit whenever that unit holds data specified by the request in an open cache file. To insure cache coherency, a cache file is opened on the cache storage unit only when the corresponding original file on the network file server has been opened in a file sharing mode which prohibits the original file from being modified while open.

In accordance with another aspect of the invention, the non-volatile cache storage unit may be advantageously connected to the client computer by means of the network. In this way, the cache storage unit may be shared with other client computers on the network, reducing the burden on the original file servers by providing alternative access to frequently read files. When used to provide shared caching of data read from slower CD-Rom servers or remote servers accessed via slower wide-area networks, the shared cache drive reduces the burden on the network and network servers, and provides the connected client computers with faster access to frequently used data.

Alternatively, the cache storage unit may take the form of a local, non-volatile storage device, such as a local hard disk or a flash memory unit, which provides non-sharable caching of files read from the network server.

As contemplated by still another aspect of the invention, a shared cache storage unit accessed via the network may be advantageously combined with a local non-volatile cache, with both cache units storing copies of data from files accessed from network file servers. When a read request is issued, data is read from the local non-volatile cache if the requested data is present there, secondarily from the shared network cache if present there, and finally from the primary file server if the requested data is present in neither the local nor the shared cache units.

In accordance with still another feature of the invention, requests to open certain types of files in modes that would permit concurrent writing to a designated file by another executing program may be instead opened in a "deny write" mode to provide a safe mode for caching. To facilitate the identification of files which should be opened in deny write mode, the user can provide a list of file type identifiers (such as the file extensions "EXE", "DLL", etc.) which can be compared with the file designations contained in file open requests and, if found, the file open request can be overridden to specify that the file be opened on the file server in a mode which is safe for caching.

As contemplated by the invention, each file operation request from an executing application program to the operating system is intercepted by a resident request redirector which controls access to the file server, the shared network cache and the local non-volatile cache to insure fast, safe caching operations which improve the performance of network data transfer operations. This caching mechanism operates on top of, and requires no modifications to, the operation of the operation system and network file system.

DESCRIPTION OF THE PREFERRED EMBODIMENT

Figure 1:
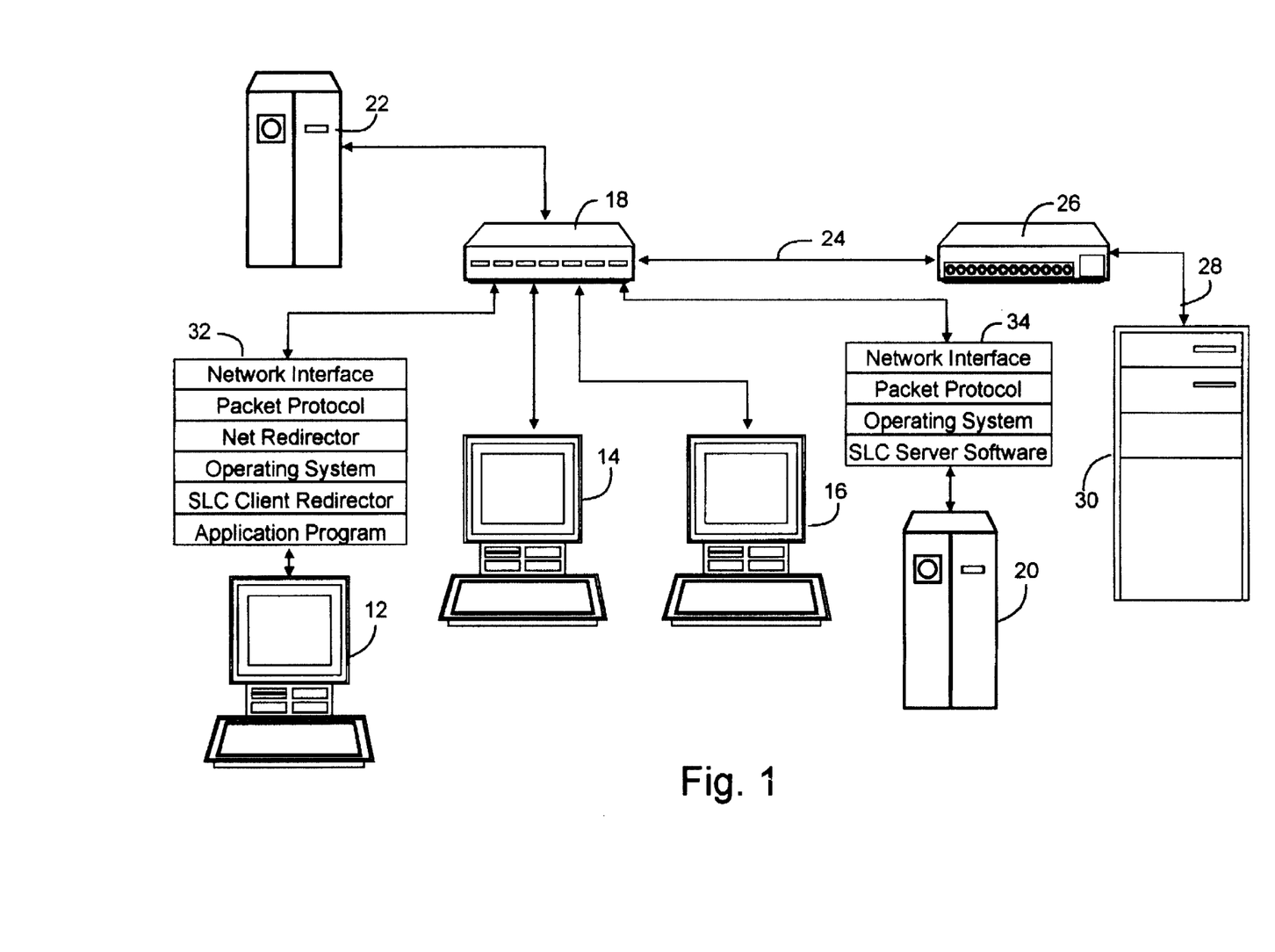
FIGS. 1 is a block diagram of a distributed computing system in which a plurality of client computers are connected to a shared LAN cache system for improving the efficiency of data transfers over a local area network and a wide area network.

The network caching system contemplated by the present invention is utilized in a computer hardware environment illustrated by the example seen in FIG. 1. As shown, a plurality of client workstations illustrated at 12, 14 and 16 are connected in a common local area network (LAN) segment to a hub/switch unit 18. A shared LAN cache (SLC) server 20 and a conventional network file server 22 are also directly connected to the hub/switch 18. A LAN pathway 24 from the hub 18 is connected to a router 26 which is in turn connected via a wide area network (WAN) 28 to a remote file server seen at 30.

Each of the client workstations includes a processor and its own local storage and each performs a layered set of functions illustrated at 32 for the workstation 12. At the network interface level, the workstation includes network connection hardware and associated device driver software for providing conventional network communications to other network nodes via the hub/switch 18. The next two functional levels seen at 32 establish network communications utilizing a predetermined packet switching protocol operating in conjunction with a network redirector layer to make the external servers (the shared LAN cache server 20, the network server 22, and the remote server 30) available as logical drives which are accessible through the network using conventional mechanisms such as NetBEUI, IPX, DECNet, Vines IP, or any other NETBIOS compatible network protocol. Files residing on remote file servers are accessed via the client workstation's operating system as files residing on logical drives which are available to the application programs executing on that client.

In accordance with the invention and as described in more detail below, a shared LAN cache client software module executes on each client workstation and serves as an interface between the application programs and the operating system file system. The shared LAN cache client module intercepts file access requests which are issued to the operating system from executing application programs, redirecting these requests when appropriate to manage the caching of information in both the shared LAN cache (SLC) server 20 and a local LAN cache (LLC) maintained by local, non-volatile storage in the workstation. It is important to note that the cache management mechanisms contemplated by the invention operate on top of and independently of the particular network infrastructure used, and may be used with any suitable network operating system.

As indicated at 34 in FIG. 1, the shared LAN cache server 20 provides similar layers of functionality, including conventional network interface, packet protocol and operating system layers which provide network communications between a the client workstations 12, 14 and 16 and the LAN cache server software program, seen as the last of the server functional layers 34 in FIG. 1.

In the illustrative embodiment to be described, the client workstations illustrated at 12, 13 and 14 take the form of conventional IBM-compatible personal computers (PCs) which typically execute Windows application programs operating in the Microsoft Windows 3.1 environment using the MS DOS operating system to perform file access operations. Application programs typically issue file access programs by executing DOS INT 21H function calls. In a network environment, such function calls normally invoke networking redirector routines, such as the Novell NETX redirector. Variations of this redirector include the DOS versions (NET3, NET4, etc.) as well as EMSNETX, all of which use the INT 21H interface. The shared LAN cache client software is loaded after and hooks into the existing INT 21H handler routines. Newer Novell VLM client redirectors use the INT 2FH functions, permitting the SLC client to be loaded before or after the VLM networking shell. When the application program issues an file access function call, the SLC client intercepts that call and takes the appropriate action. The response of the SLC client to different file access function calls is depicted in detail in the flowcharts presented in FIGS. 2-11 of the drawings.

Figure 2:
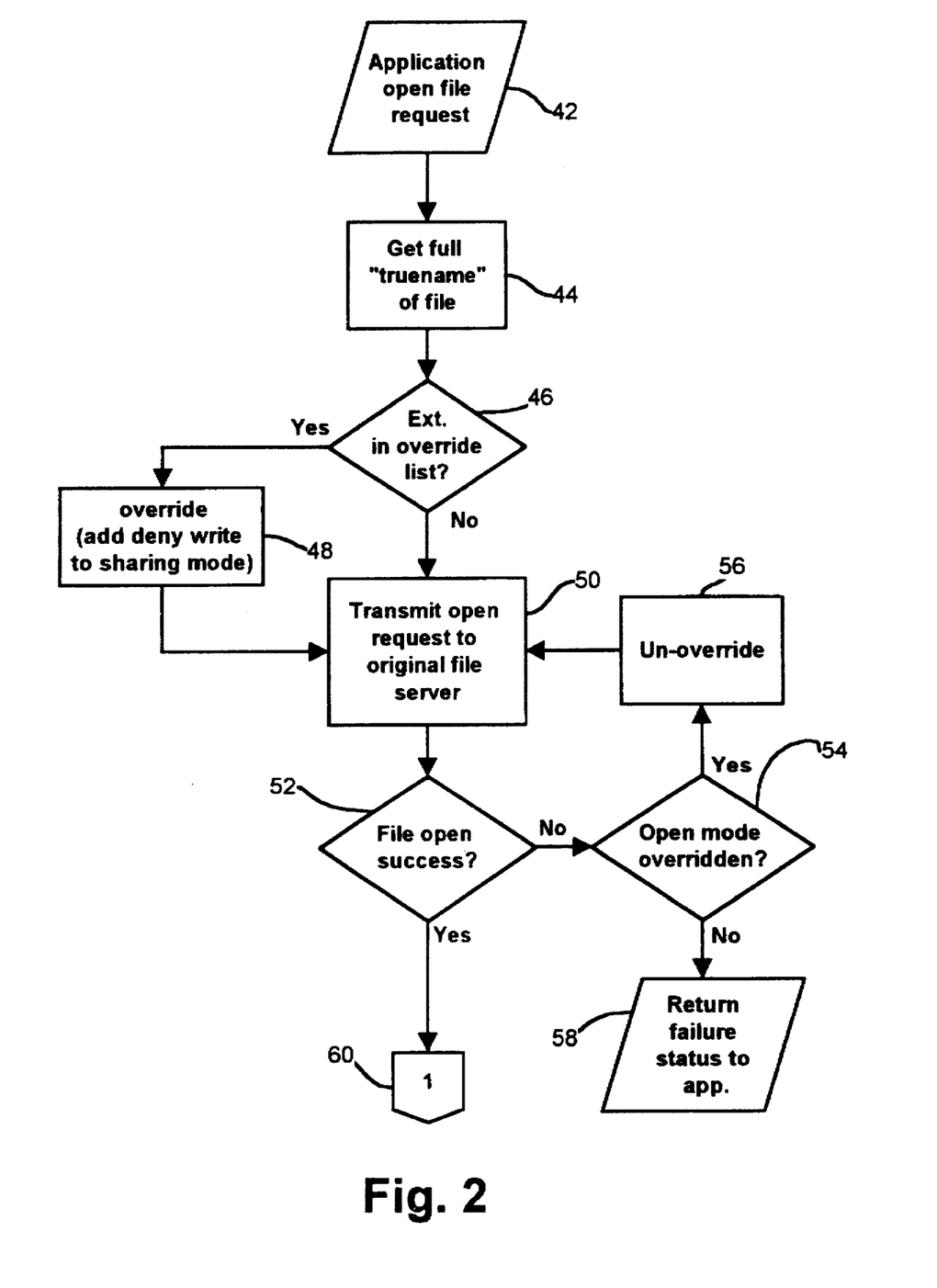
FIGS. 2 and 3 are flowcharts which illustrate the principle functions performed by a preferred embodiment of the invention in response to a file open request issued by an application program.
Figure 3:
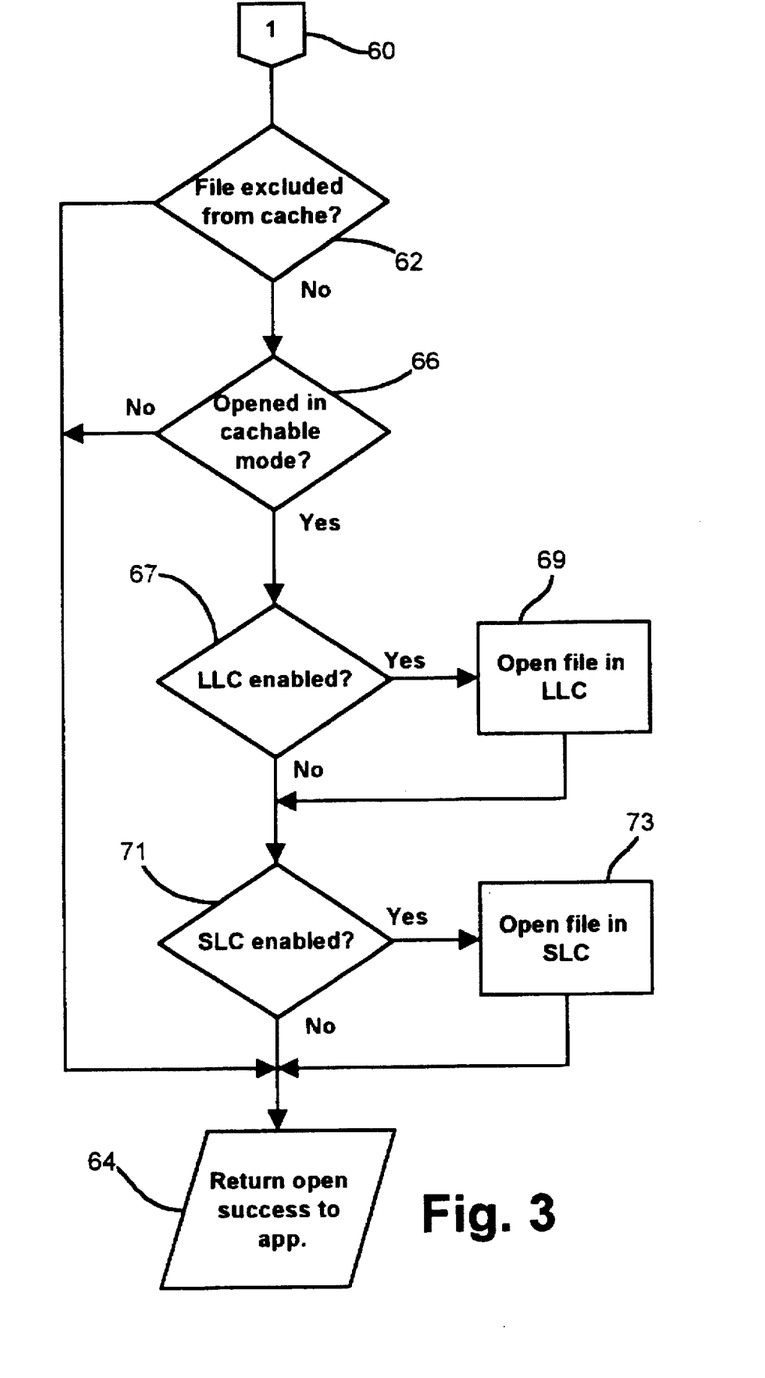

FIGS. 2 and 3 together show the manner in which a file open request (DOS INT 21H function 0F) is handled by the SLC client. When the application issues the file open request as indicated at 42 in FIG. 2, the address of an unopened file control block (FCB) is passed in the processor's DS:DX register pair, with the function value 0F being placed in the AH register when INT 21H call is executed. Detailed information on the details of conventional DOS function calls may be found in the literature, for example: *The MS DOS Handbook*, by Richard Allen King, Sybex, Inc., Berkeley, Calif. (1985).

At the time INT 21H is invoked to request a file open operation, the FCB contains the drive specification, filename and filename extension for the file to be opened. The SLC client then obtains the "truename" for the file at 44 using the DOS TRUENAME command which converts the filename from the FCB into a fully qualified Universal Naming Convention (UNC) filename, which provides the both the full path name of the file and the identification of the server and volume, the "truename" having the form:

\\SERVER\RESOURCE\SUBSTRUCTURE\ITEM

For example, a file referenced by the DOS filename Z:\MINE.TXT on a Novell file server might have the truename \\MT12\SYS\USER\GUEST\MINE.TXT. The shared LAN cache client identifies all files by their full truenames so that, in the example seen in FIG. 1, the shared LAN cache client executing on the workstation PC 12 maintains names of accessed files by their full truenames which thus indicate whether a given file was accessed from the network file server 22 or the remote file server 30.

As indicated at 46, the SLC client then determines whether or not the truename for the file to be opened is contained on a list of "override" extensions. If the extension of the file to be opened is on the override list, the file is opened in a "deny write" mode even if the application requests that it be opened in the potentially unsafe "Read/Write Deny None" mode. This override function permits the shared LAN cache to be operated safely with applications which open files in dangerous modes on networks. For example, the override list (which may be configured by the user) might include the extensions DOC, DLL, EXE, TMP and XLS, indicating that all filenamess ending with those extensions should be opened in a sharing mode which is forced to "Deny Write" even though the application program making the file open call may indicated that other executing programs may also write to the file. Only files having the designated extensions will have their file sharing modes altered at 48 to deny writing privileges to other programs.

As indicated at 50, the SLC client then passes the file open request to the hooked conventional I/O interrupt handler to request the file server designated in the truename to open the file in the (possibly altered) sharing mode. If the designated file server is unable for any reason to open the file successfully as indicated by the function return code at 52, a test is performed by the SLC client at 54 to determine whether the sharing mode has been overridden at 48. If that is the case, a further I/O file open function call is produced at 56 to reinstate the original file sharing mode for the file. If the file open request is unsuccessful when the open sharing mode is not overridden, the open failure return code is returned to the application program as indicated at 58. If the file was successfully opened, processing continues at 60, the end point on the flowchart of FIG. 1 and the entry point on FIG. 2.

At 62, the truename extension of the file successfully opened on its server is checked against a list of extensions which are to be excluded from the cache. This file filter exclusion function is useful when the user knows in advance that certain files are unlikely to ever by read twice and hence will not benefit from non-volatile caching. In addition, any logical device or volume indicated by a pathname may also be excluded. If the test at 62 determines that a given file which has been successfully opened by the original server is excluded from the caching, no cache files are opened and the successful open return code is passed to the calling application program as indicated at 64.

If the opened file is not excluded from caching at 62, a test is then performed at 66 to determine if the file has been opened in a cacheable mode. The SLC client ensures that data integrity is maintained and never caches data that could be changing dynamically on the network. The conditions under which caching is permitted or denied is summarized in the table below:

| Sharing Node | First User | Other User |
| --- | --- | --- |
| Read Only - Deny Write | Cached | Cached |
| Read/Write - Deny All | Cached | Not Cached |
| Read/Write - Deny None | Not Cached[1] | Not Cached |
| Read Only - Deny None | Not Cached[1] | Not Cached |
| Override to Deny Write | Cached | Not Cached |

When a file is opened as Read Only-Deny Write, all users on the network can read the file but no one is allowed to change the file as long as even one user has the file opened in this mode. In this case, it is safe for all users to cache the data read from the file because no other user can alter the contents of the file. This is a common file open mode for application software and programs stored on file servers.

When a file is opened as Read/Write-Deny All, no other user on the network can access or change the file until the file is closed. In this case, it is safe for SLC to cache Reads and Writes to the file because no other user can alter the contents of the file. This is a common file open mode for documents (word processing, spreadsheets, graphics) that can only be used by a single user at any instant in time.

Files opened in Read/Write-Deny None, or Read Only-Deny None, cannot be safely cached by SLC or any other caching software (without using the override mechanism discussed above). The access methods to these files are application specific and generally handled through semaphores or record locks sent to the file server.

The largest Read/Write-Deny None files in use today are generally database files (like Microsoft Access) that must be opened in this mode to allow multiple users to read and write data records. Enhancing the performance of large database access is receiving a lot of interest in the market and the trend is to deploy SQL Database Servers. SQL Servers efficiently address access to large databases across LANs and WANs. The SLC mechanism will not cache the database, but will cache the executable files, forms and other program components.

One exception to all of the preceding file open rules occurs when a file is marked as Read-Only. A file marked as Read-Only is not to be confused with the user's rights to a file on the network. The Read-Only file attribute takes precedence over all of the user's rights to the file on the network and the file open modes. Even a user with unlimited rights to a file cannot write to a file that has been marked Read-Only. Marking files Read-Only is a simple way to guarantee that the files will not be accidentally modified and also guarantees that the files will be cached by the SLC independent of the way the file is opened by the application software.

The SLC client mechanism can be configured at initialization (by the ONLYCACHEREADONLY setting in the SLC.INI file) to cause the SLC client to only cache Read-Only files. This keeps application software files that have been marked Read-Only from getting rolled out of the SLC cache by Read-Write file activity.

When it is determined, as seen at 66 in FIG. 3, that the file, successfully opened on the network server, was not opened in a cacheable sharing mode, the return code indicating a successful file open is returned at 64. Otherwise, the file may also be opened on either the local LAN cache (LLN), the shared LAN cache (SLC), or both. The shared LAN cache is maintained by the shared LAN cache server indicated at 34 and 20 in FIG. 1. The local LAN cache is implemented by the workstation's local hard drive or a bank of flash memory, either of which may be used to provide non-volatile storage which may be accessed by the SLC client program as a local mass storage drive. The SLC and LLC operate independently. Although the LLC typically provides faster performance than the SLC, it is not shared with other workstations and, for this reason, provides less relief to the network file server storing original files.

Both the SLC and LLC may be independently enabled and disabled at a client workstation. If a casheable file is successfully opened, a test is performed at 67 to determine whether the LLC is enabled and, if it is, the file is also opened on the SLC at 69. Similarly, if the SLC is enabled as determined at 71, the file is also opened on the shared LAN cache as indicated at 73. The file open procedure terminates at 64 with a successful operation code being returned to the application program which requested the file opening.

Figure 4:
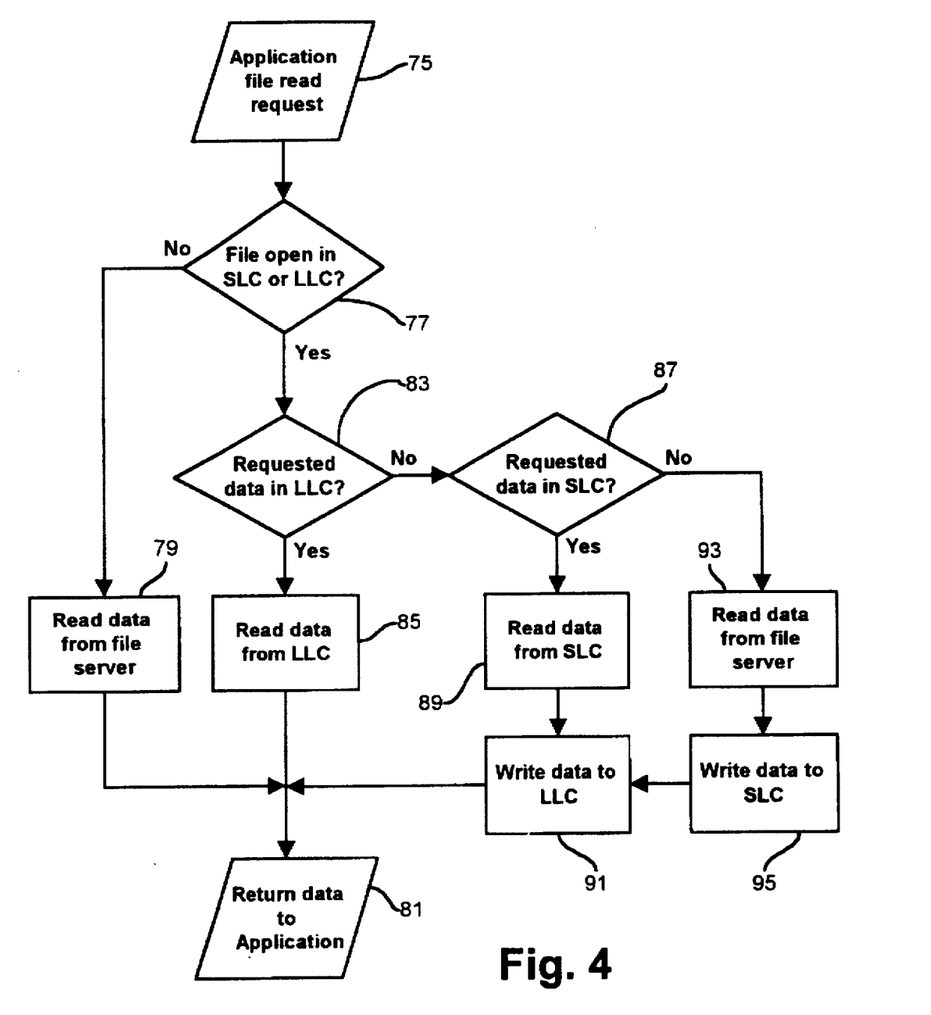
FIG. 4 is a flowchart depicting the steps performed when an application program issues a file read request.

FIG. 4 of the drawings illustrates the sequence of operations performed when an application program issues a file read request at 75 using DOS INT 21H, function 3FH. A test is performed at 77 to determine whether the file specified in the read request has been opened in either the SLC or the LLC. If not, the data requested is simply read from the original server as indicated at 79 and the data is returned to the application as seen at 81.

If the designated file is being cached, a test is then made at 83 to determine whether the requested data is in the LLC. The read request identifies a file control block FCB which specifies the position and size of the requested data within the file. This data specification is compared with a table maintained by the SLC client which identifies which portions of a cached file are present in the cache. If the requested data is present in the LLC, the requested data is read from the LLC (instead of from the original server or the SLC) at 85 and returned to the application in the transfer area of memory designated by the FCB as indicated at 81. If the requested data is not present in the LLC, a test is performed at 87 to determine if it present in the SLC. If the SLC holds the data, it is read from the SLC at 89 and then written into the LLC as indicated at 91. If the data is present in neither the SLC nor the LLC, it is read from the original file server as indicated at 93, then written into the SLC at 95 and also written into the LLC at 91 before returning the data to the application at 81.

The SLC server seen at 34 and 20 in FIG. 1 provides a shared cache of data to a group of SLC Clients illustrated by the workstations 12, 14 and 16 that are connected to the same LAN segment via the hub/switch 18. The SLC server responds to requests made by the SLC client workstations for data that is already stored in the shared cache. As illustrated at 95, the SLC server also stores data that is initially read from the file servers by an SLC client and then transmitted to the shared cache of the SLC Server. In a similar fashion, the local LAN cache also responds to requests made by the SLC client and stores data initially read from the original file server or the SLC as indicated at 91. Note that, if a given SLC client requests data for the first time that has previously be read and cached in the SLC on behalf of another SLC client, that request is satisfied from the SLC cache without burdening the original network server. Thereafter, if either of these two SLC clients requests the same data again, those requests will be satisfied by the respective LLCs without burdening either the original server of the SLC.

Note also that all file opens, locks and security checks are sent directly by the SLC client to the original file servers. After the file has been successfully opened, file read requests are then automatically redirected by the SLC Client to the SLC and LLC servers. SLC and LLC servers have no formal relationship with the original file servers. They do not log into any of the file servers and do not consume any network connections on the networks. In fact, the SLC and LLC servers have no rights or privileges to any of the data stored on the file server. Data stored in the SLC and LLC are written there by the SLC Client that has the rights necessary to open the files and access the data. Access to the data in the SLC and LLC is always controlled by the file server each time an SLC Client attempts to open a file.

Figure 5:
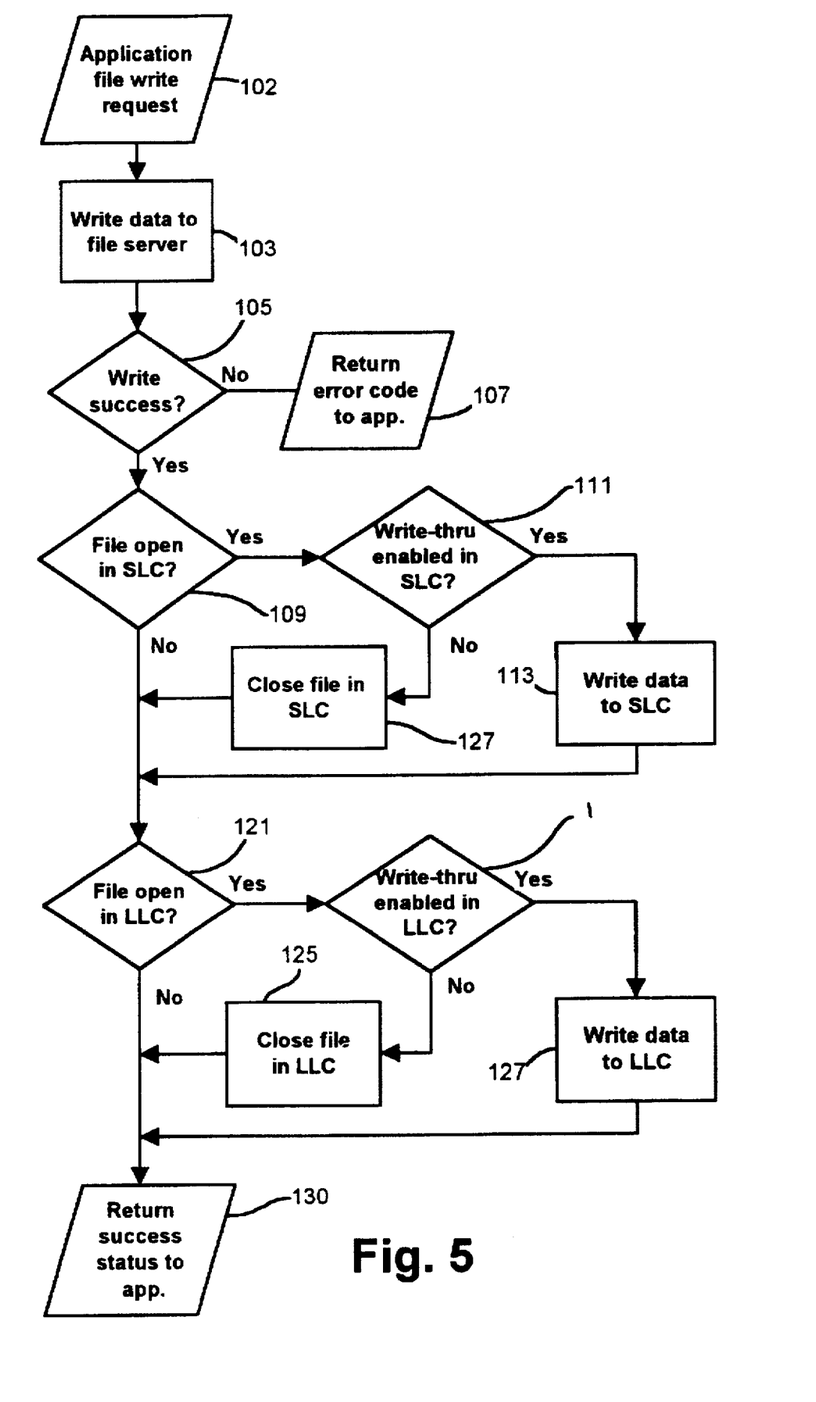
FIG. 5 is a flowchart illustrating the functions performed in response to a file write request.

File write requests are first sent to the original file-server and then sent to the SLC and LLC servers if WRITECACHING is enabled as illustrated in more detail in FIG. 5. When the application issues a file write request by executing INT 21H, function 40H, the interrupt is intercepted by the SLC client which writes the data to the original file server as requested at 103. If the requested write operation at the original file server was unsuccessful, a failure code is returned to the application at 107. Otherwise, a test is performed at 109 to determine of the file designated in the write request is open on the SLC. If it is open, a test is performed at 111 to determine if write caching at the SLC has been enabled. Write caching may be enabled at either the SLC or the LLC on a selective basis at initialization time or thereafter from the DOS command line. If write caching has been enabled at the SLC, the data written to the original server at 103 is also written to the SLC at 113. If it is determined that the file being written is open on the SLC but that write caching has been disabled, the file is closed on the SLC as indicated at 115. Similar functions are performed with respect to the LLC. A test at 121 determines whether the written file is open on the LLC and, if so, a test is made at 123 to determine if write caching at the LLC is enabled. If write caching at the LLC has been disabled, the written file is closed on the LLC at 125, otherwise it is written to at 127. The write operation concludes with a successful operation code being returned to the application at 130.

Figures 6, 7:
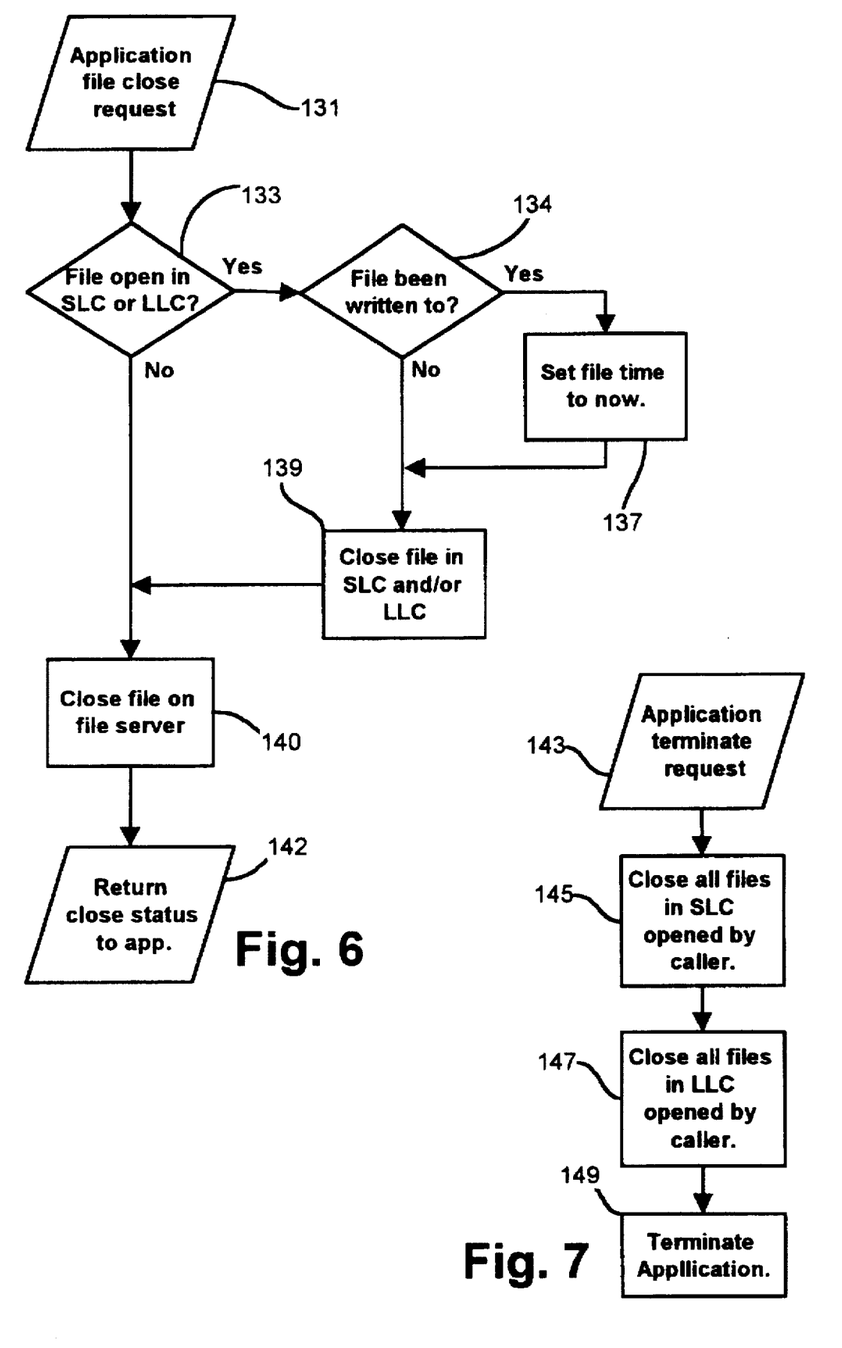
FIG. 6 is a flowchart showing the steps performed when a request is issued to close a previously opened file.
FIG. 7 is a flowchart showing the sequence of steps which are performed when an application issues a termination request.

FIG. 6 illustrates the manner in which the SLC client intercepts and handles a file close request (INT 21H, function 3EH) issued by an application at 131. Tests are performed at 133 to determine if the file being closed was opened on either the SLC or the LLC. If so, further tests are performed at 134 to determine if the file has been written to in the cache system. If so, the file timestamp for each cached file is reset to the file closing time at 137. The open files in the SLC and/or LLC are then closed at 139 and closed on the original server at 140 before returning a successful return code at 142.

Open files are also be closed as a group when an executing application terminates. When an executing application terminates as indicated at 143 in FIG. 7, all files opened by that application are terminated in the SLC as indicated at 145 and in the LLC as indicated at 147 before the application is shut down at 149.

Figure 8:
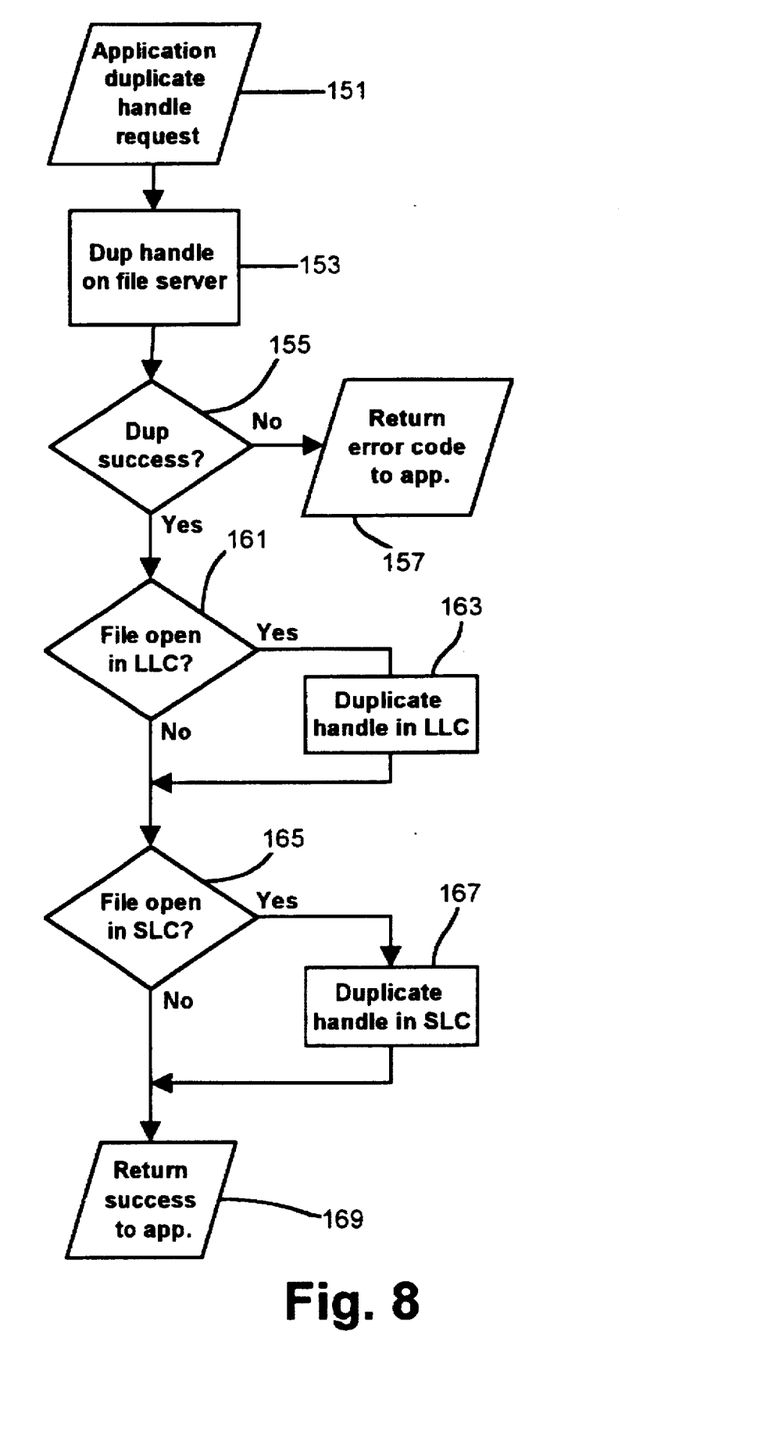
FIG. 8 is a flowchart depicting the steps performed when an application requests a duplicate file handle.

FIG. 8 illustrates the steps performed by the SLC client when an application issues a request for a duplicate file handle (INT 21H, function 45H). In making this function call at 151, the application provides the handle of an existing file and is requesting an entirely new handle for that file. This request is first passed at 153 to the original file server holding the file identified by the existing handle. If the test at 155 of the return code indicates a failure in obtaining the new handle, the requesting application is notified of the error at 157. Otherwise, a test is performed at 161 to determine if the file is also open on the LLC and, if it is, a duplicate handle on that server is obtained as indicate at 163. Similarly, if the test at 165 reveals that the file is also open on the SLC, a duplicate SLC handle is obtained at 167. The application requesting the duplicate handle is then notified of the successful completion at 169.

Figure 9:
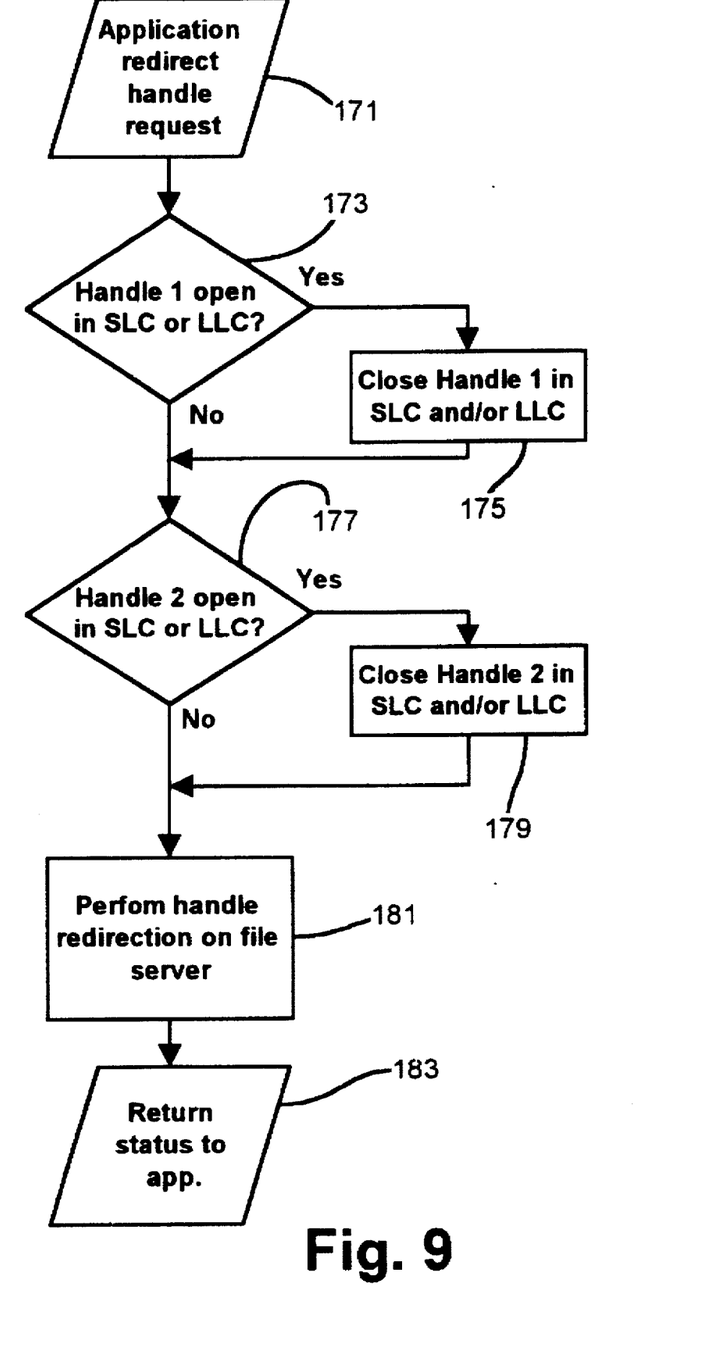
FIG. 9 is a flowchart which illustrates the functions performed when an application requests that a given file handle be redirected to another file.

An application request to detach a handle from one file and direct it to another file (DOS INT 21H, function 46H) is handled as shown in FIG. 9 of the drawings. The two handles (Handle 1 and Handle 2) are provided by the request issued at 171. If Handle 1 is open on either the SLC or LLC server as determined by tests at 173, those handles are closed on the open cache server as indicate at 175. Similarly, if Handle 2 is open on either server as indicated at 177, it is closed on the open cache server as indicated at 179. The redirection request is then passed in usual fashion to the file server as indicated at 181 and the resulting status code is returned to the application as seen at 183.

Figure 10:
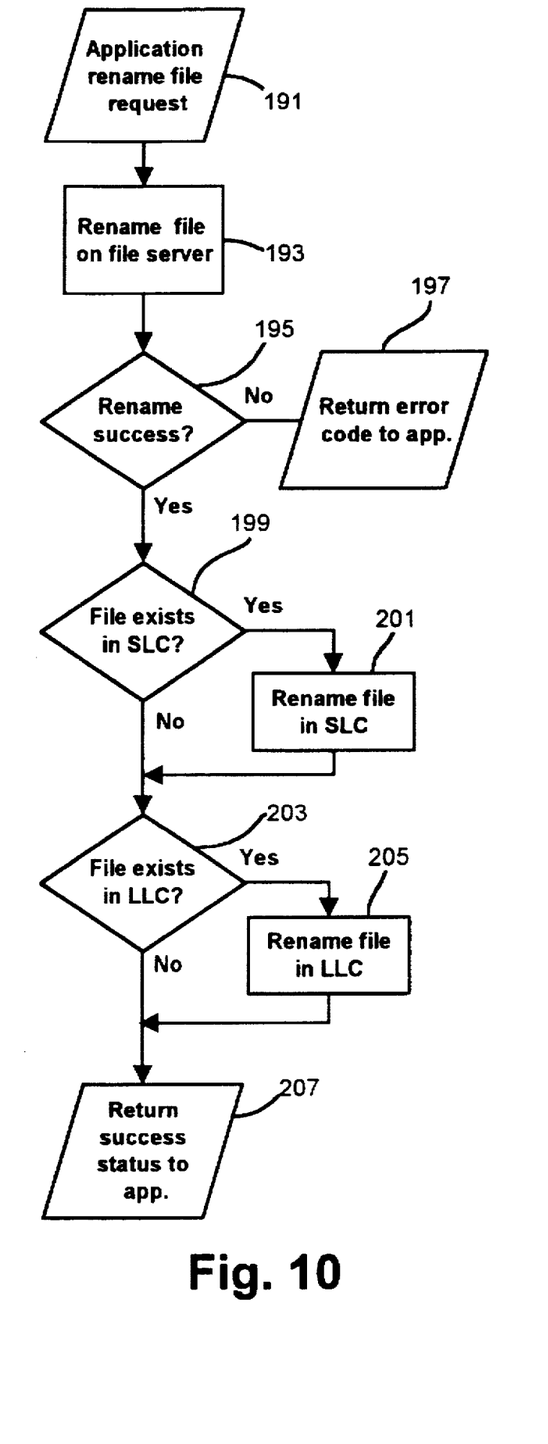
FIG. 10 is a flowchart showing the steps followed in response to a request to rename a file.
Figure 11:
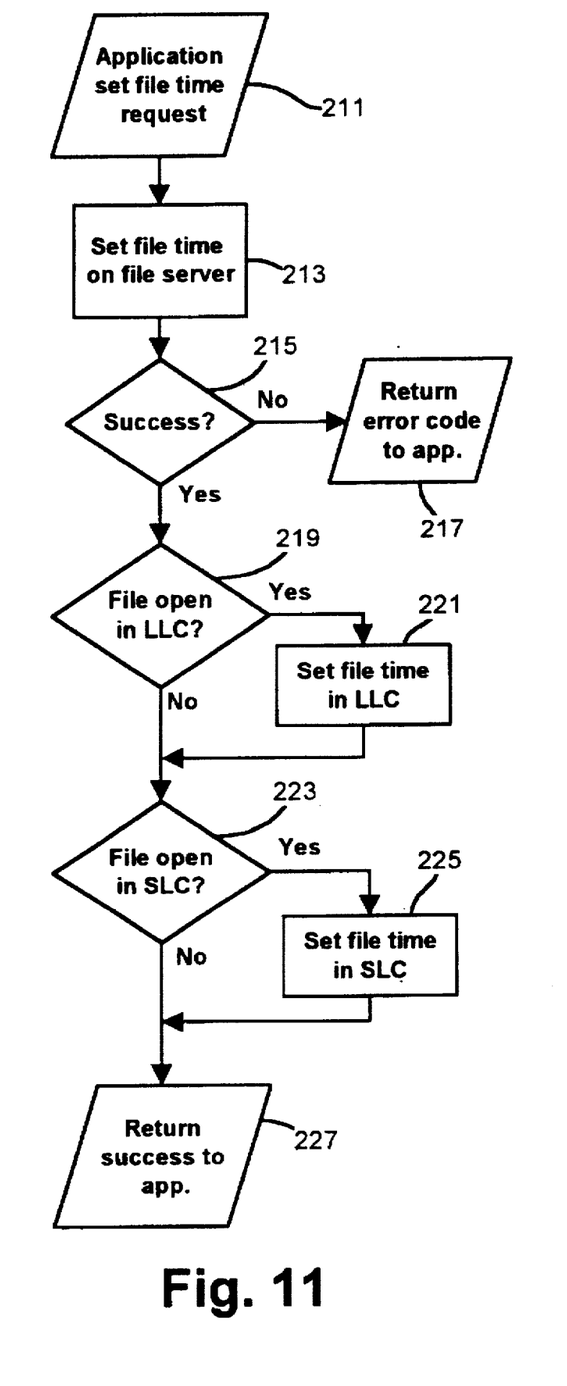
FIG. 11 is a flowchart illustrating the steps performed when an application requests the resetting of the timestamp value associated with a given file.

Application program requests to rename a file (DOS INT 21H, function 56H) are handled as shown in FIG. 10 of the drawings. The request issued at 191 is intercepted and passed to the original file server which renames the file as indicated at 193. If the return code test at 195 indicates that renaming failed, the calling application is so notified at 197. Otherwise, a test is made to determine whether the file is stored in the SLC at 199. If so it is renamed at 201. Similarly, a test is performed at 203 to determine if the renamed file is present in the LLC and, if so, it is renamed at 205. A code indicating successful renaming is returned at 207.

When an application issues a request to reset a file's date and time (DOS INT 21H, function 57H), the SLC client performs the functions indicated in FIG. 10. The timestamp reset request is intercepted at 211 and the file timestamp on the original file server is reset at 213. If the return code test at 215 indicates a failure, the application is so advised at 217. If the file is also open on the SLC as indicated by the test at 219, the SLC file timestamp is reset to the same new value at 221. In a similar fashion, if the file is open on the LLC as indicated at 223, its timestamp is reset at 225. The requesting application is then advised of the successful completion at 227.

When the SLC client program is loaded to initialize the operation of the shared LAN cache mechanism, it read a configuration file (e.g. named "SLC.INI") which contains two sections which can be used to customize the user's SLC client environment, the local cache system and the shared LAN cache system. Individual section of the configuration file are indicated by labels in brackets in the listing below, which sets forth sample entries and an explanation of each entry:

[File System]
Path=C:\SLC.SWP

The full path to the SLC Client cache on the local hard disk. The default SLC cache file name is SLC.SWP and is a hidden file.

DefaultFileSize=10M

The size of the local cache file in Kilobytes (K), Megabytes (M) or Gigabytes (G). A value of zero permanently disables the use of the local cache so all other settings in this section are ignored. Default is 10M.

MaxHandles=100

SLC uses a maximum of 3 DOS file handles and uses the MaxHandles parameter to allocate its own private file handles to entries in the SLC cache. Default is 100.

MaxValidRegions=100

The number of discontinuous valid regions allowed in a cached file.
Default is 100.

MaxDirEntries=Auto

The maximum number of files that may exist at one time in the cache. If the number is exceeded the oldest file is discarded to make room for new files. Default is Auto. Valid range is 500 to 10,000

SectorSize=Auto

The minimum allocation size in bytes within the cache swap file. Default value is Auto. Valid range is 4096 to 32768 bytes.

SectorBuffers=10

The number of sector buffers available to SLC. Default is 10 buffers.

ReadAhead=1

The number of sector buffers to pre-read from the file system. Set to 0 to disable read-ahead sector caching. Default is 1.

??ReserveReadOnly=70%

The percentage of the SLC cache that is reserved for Read files. This setting keeps application software files that have been marked as Read-Only from being rolled out of the cache.

RequireUNC=True

This setting controls whether or not the SLC file system uses UNC as part of the logic to identify unique files in the cache. For example, if set to true, the exact same EXCEL.EXE file on three different file servers will appear as three separate entries in the SLC cache. If set to false, SLC will ignore the UNC location of the file and only use date, time and size to identify file.

OnlyCacheReadOnly=False (True, False)

Enabling ONLYCACHEREADONLY causes SLC to only cache files that have been specifically marked Read-Only on the file server. Default is False.

Encryption=False

This setting controls whether or not the SLC file system uses encryption on the contents of the local cache. If the user is already using a hard disk encryption controller or access key-card to the local hard disk, this setting is unnecessary.

[Local Cache]

Enable=True (True, False)

Set to True to start up with the local cache enabled, False to start up in the disabled state. After the SLC Client is loaded, the state can be toggled dynamically from the DOS command line or from the SLC Windows program.

WriteCaching=True (True, False)

WriteCaching controls whether SLC caches data written to the file server. After start up, this state can be toggled dynamically from the DOS command line or from the SLC Windows program.

??TestValidData=0

Reserved for testing SLC. Causes SLC to do a double read of data from the network and test for possible network errors.

LogSquelchLevel=0

Reserved for testing SLC. Controls the current level of logging to the SLC.LOG file. Increasing the LOG Squelch level slows performance and is only used for debugging. The log level can be changed dynamically from the DOS command line or from the SLCWIN interface.

| | |
|---|---|
| 0 = Default | Only log SLC configuration changes |
| 1 = Error | Log all SLC Errors |
| 2 = Warning | Log all SLC Warnings |
| 3 = LogAll | Log all normal SLC operation |

[Shared Cache]
Enable=True (True, False)

Set to True to start up with the local cache enabled. False to start up in the disabled state. After the SLC Client is loaded, the state can be toggled dynamically from the DOS command line or from the SLCWIN program.

WriteCaching=True (True, False)

WriteCaching controls whether SLC will cache data written to the original file server. If this is disabled, the cache will only get loaded when data is read from the file server. After start up, this state can be toggled dynamically from the DOS command line or from the SLCWIN program.

PreferredServer=Fastest

The preferred SLC Server name. If the preferred server name is not found, the SLC Client will automatically connect to the fastest SLC Server available. Default is to use the fastest SLC Server.

[File Filters]
ExcludeExtension=TMP, GRP, MDB (No Defaults)

This entry allows specific file extensions to be excluded from the SLC cache. This is useful when the user knows in advance that certain files are never read twice and will not benefit from non-volatile caching. Up to 20 extensions can be excluded. There are no defaults.

| | |
|---|---|
| ExcludeUNC01 | = \\SERVER\VOLUME\FILE |
| ExcludeUNC02 | = \\MTI3\SYS\SHARED |
| . | . |
| . | . |
| . | . |
| ExcludeUNC10 | = \\MTI3\SYS\DATABASE |

The ExcludeUNC option allows any logical device, volume or even file to be excluded from the SLC cache. Up to 10 UNC paths can be excluded from the SLC cache.

[OverRide]
ForceDenyWrite=DOC, DLL, EXE, TMP, XLS

This option automatically overrides unsafe network file opens (Read/Write-Deny None and Read Only-Deny None) to a safe network mode that also allows the file to be cached by SLC. Up to 20 extensions can be overridden. There are no defaults.

Command Line Options

In addition to the settings in the configuration file, an program named SLCDOS responds to command line options after SLC has been loaded. Entering "SLCDOS [option(s)]" at the command line may be used to establish the following options:

General SLC Options -
/U          Unload SLC Client.
/R          Reset statistics.
/G:n        Set logging squelch level to n.
            0=Default, 1=Error, 2=Warning, 3=LogAll
/?          Display a help screen (showing these command line
            options)
Local Cache Options -
/L[+|-]     Enable|Disable the local cache.
/WL[+|-]    Enable|Disable local write caching.
Local File System Options -

-continued

/V           Display File System Information.
/C: [cachesize]   Specifies the size of the local cache (KBytes).
/F           Flush the local cache.
/DL: [filespec]   Show directory of files in the local cache.
Shared Cache Options -
/S[+|-]      Enable|Disable the shared cache.
/WS[+|-]     Enable|Disable shared write caching.
/P: [servername] Set Preferred server name.

Status regarding operation of the SLC Client is available from the DOS prompt by typing SLCDOS with no command line arguments after the SLC Client software has been loaded. The screen displays the current status of Shared and Local caching as well as statistics on the current cache operations.

Shared LAN Cache Server Software

The SLC server software resides in the SLC cache server seen at 20 in FIG. 1 and constitutes the program layer as seen at 34. If the data is not found in either the local or shared SLC cache, the SLC Client reads the requested data from the original file server and also transmits the data to the SLC Server. The transmission of data to the SLC Server occurs during the shadow of time when the SLC Client is waiting for data from the original file server and causes little degradation in performance. If local SLC caching is enabled, the data read from the file server is also automatically written to the local non-volatile cache.

Shared LAN Cache redefines the traditional role of file servers by off-loading the overhead of redundant data requests to one or more SLC servers. These SLC servers are distributed across LANs and WANs as required based on the level of caching and performance desired. SLC Servers can also be used to dramatically enhance the performance of wireless LANs. An SLC server is not a file server. All rights to data stored in the SLC server's shared cache must first be granted to the SLC Clients when files are opened on the file servers as described above. Once the files have been opened, the SLC Server operates transparently to the file servers, responding to data requests from the SLC Clients. The file servers continue to be responsible for administering security, application metering and mass storage archiving.

Shared LAN Cache Servers improve the performance of existing file servers by off-loading redundant file read requests. In many installations, this can account for as much as 80% of the file servers activity. Redirecting these requests to an SLC server off-loads the existing file server making it more responsive for other tasks. SLC Server performance is comparable to that of original file servers and improves the performance of these file servers by off-loading data read requests. SLC Servers can even improve network performance under heavy load by splitting the read requests with the file servers.

The SLC server requires no complex setup; it is simply plugged into the local LAN segment and begins caching data requests from the SLC Clients. The SLC servers are pre-configured with various combinations of RAM and hard disk and require no administration or support. The transmission of data to and from the SLC Server occurs automatically when the SLC Client requests data from the file server. The SLC server hardware indicated at 20 in FIG. 1 is a conventional file server provided with a network interface card appropriate for the existing network. The SLC Server is connected using an appropriate cable to either a hub or switch as indicated at 18 in FIG. 1. Popular network connections include the 10 Mbps Ethernet interface that supports 10BaseT, AUI and thin Ethernet wiring. Fast Ethernet and FDDI configurations may be used to connect the SLC Server to a high speed switch or router such as the router 26 seen in FIG. 1. The shared LAN cache mechanism contemplated by the invention is particularly useful for caching transfers via a wide area network (WAN) from a remote file server as indicated at 28 and 30 in FIG. 1.

As described above, the SLC client software is packaged as an INT 21 front-end redirector that intercepts and redirects DOS/Windows INT 21 file requests. The client software may take the form of a real mode or protected mode executable file (.EXE) which is loaded after and on top of the network shell in a DOS system. Under Windows 3.1, the SLC client software conveniently takes the form of a dynamic link library (.DLL). The details of the SLC client software, highlighted in the previous discussion presented in connection with the attached drawings, are presented in the attached program listing. The program as listed (Copyright 1995, 1996 Measurement Techniques, Inc.) is compilable into executable form using the Microsoft C++ compiler available from Microsoft Corporation.

What is claimed is:

1. A method for caching data transferred to a client computer over a network pathway from a file server, said method comprising, in combination, the steps of:

providing a cache storage unit connected to said client computer for persistently storing cache files, executing a program on said client computer which issues file open and file read requests directed to a designated file on said file server, and providing a redirector program on said client computer for performing the steps of:

responding to each of said file open requests by:
opening said designated file on said file server, and
opening a cache file associated with said designated file on said cache storage unit only if said designated file while open on said file server is not subject to being modified by a different executing program, and responding to each file read request for specified data in said designated file by:
transferring said specified data to said client computer from said designated file on said file server for use by said program if there is no open cache file corresponding to said designated file which contains said specified data, and
otherwise transferring said specified data to said client computer from said open cache file when said open cache file contains said specified data.

2. The method set forth in claim 1 wherein said cache storage unit is connected to said client computer via a data transfer pathway independent of said network pathway.

3. The method set forth in claim 1 wherein said cache storage unit is connected to said client computer via said network pathway.

4. The method set forth in claim 3 wherein said client computer is one of a plurality of computers connected to said network pathway to share information stored on said file server and on said cache storage unit.

5. The method as set forth in claim 3 further comprising the steps of:

providing a second cache storage unit connected to said client computer via a data transfer pathway independent of said network pathway, and opening a second cache file on said secondary cache storage unit associated with said designated file when said cache file is opened on said cache storage unit.

6. The method as set forth in claim 5 said redirector program on said client computer, in response to each file read request for specified data in said designated file, further performs the step of transferring said specified data to said client computer from said open second cache file when said open second cache file contains said specified data.

7. The method as set forth in claim 1 wherein said step of opening said designated file on said file server comprises the substeps of:

determining from said file open request whether said designated file belongs to a predetermined subset of files which are to be opened on said file server in a deny write mode which will prevent any other program from writing to said designated file while open, and if said designated file is in said predetermined subset, opening said designated file on said file server in said deny write mode even when said file open request from said program does not request said deny write mode.

8. The method as set forth in claim 7 wherein said step of determining from said file open request whether said designated file belongs to a predetermined subset of files comprises, in combination, the steps of maintaining a list of file type identifiers which designate file types which are to be opened in deny write mode and means for comparing information describing said designated file with said file type identifiers.

9. The method of claim 1 wherein said program issues file write requests to write specified data into said designated file and wherein said redirector program further performs the steps of:

responding to said file write request by writing said specified data into said designated file on said file server, determining if a cache file associated with said designated file is open on said cache storage unit and, if so, additionally writing said specified data to said associated cache file.

10. The method of claim 9 wherein said program issues file close requests to close said designated file and wherein said redirector program further performs the steps of:

responding to said file close request by closing said designated file on said file server and, if a cache file associated with said designated file is open on said cache storage unit, also closing said cache file.

11. A network data cache system comprising, in combination, a data transmission network, a file server connected to said network for storing identifiable files of information, a client computer connected to said network for accessing said files stored on said file server, a non-volatile cache storage unit connected to said computer for persistently storing data, at least one application program executable on said client computer for issuing file open requests and file read requests, a redirector program executable on said client computer for intercepting said file open requests and said file read requests, said redirector program including:

means responsive to a given file open request from said application program which specifies a designated file on said file server for opening said designated file on said file server, status check means responsive to said given file open request for determining whether said designated file, as opened on said file server, can be modified while open, means responsive to said status check means for opening a first cache file on said cache storage unit corresponding to said designated file if said designated file cannot be modified while open, and means responsive to a given file read request from said application program to read specified data from said designated file for transferring said specified data to said application program from said cache file instead of from said designated file when said specified data is present within an open cache file.

12. A network data cache system as set forth in claim 11 wherein said cache storage unit is connected to said client computer via a transmission pathway independent of said network.

13. A network data cache system as set forth in claim 11 wherein said cache storage unit is connected to said client computer via said network.

14. A network data cache system as set forth in claim 13 wherein said client computer is one of a plurality of computers connected to said network.

15. The network data cache set forth in claim 13 further comprising a second cache storage unit connected to said client computer via a data transfer pathway independent of said network pathway, wherein said redirector program further includes means for opening a second cache file on said secondary cache storage unit associated with said designated file when said cache file is opened on said cache storage unit.

16. The network data cache set forth in claim 15 wherein said redirector program on said client computer further includes means responsive to each file read request for specified data in said designated file for transferring said specified data to said client computer from said open second cache file when said open second cache file contains said specified data.

17. The network data cache system as set forth in claim 11 wherein redirector program further comprises:

means for determining from said file open request whether said designated file belongs to a predetermined subset of files which are to be opened on said file server in a deny write mode which will prevent any other program from writing to said designated file while open, and means for opening said designated file in said deny write mode if said designated file is in said predetermined subset even when said file open request from said program does not request said deny write mode.

18. The network data cache set forth in claim 17 wherein said means for determining from said file open request whether said designated file belongs to a predetermined subset of files comprises, in combination, means for maintaining a list of file type identifiers which designate file types which are to be opened in deny write mode and means for comparing information describing said designated file with said file type identifiers.

19. The network data cache of claim 11 wherein said application program further issues file write requests to write specified data into said designated file and wherein said redirector program further includes:

means responsive to said file write request for writing said specified data into said designated file on said file server, and means for determining if a cache file associated with said designated file is open on said cache storage unit and, if so, additionally writing said specified data to said associated cache file.

20. The network data cache of claim 19 wherein said application program issues file close requests to close said designated file and wherein said redirector program further include means responsive to said file close request for closing said designated file on said file server and, if a cache file associated with said designated file is open on said cache storage unit, for also closing said cache file.

* * * * *